(12) United States Patent
Osanai et al.

(10) Patent No.: US 10,414,461 B2
(45) Date of Patent: Sep. 17, 2019

(54) OPERATION DEVICE OF STRADDLE TYPE VEHICLE

(71) Applicant: HONDA MOTOR CO., LTD., Tokyo (JP)

(72) Inventors: Takuya Osanai, Wako (JP); Yutaka Kikuchi, Wako (JP); Masahiro Miki, Wako (JP); Manabu Ichikawa, Wako (JP); Tomoyuki Takewaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 135 days.

(21) Appl. No.: 14/663,992

(22) Filed: Mar. 20, 2015

(65) Prior Publication Data

US 2015/0274248 A1 Oct. 1, 2015

(30) Foreign Application Priority Data

Mar. 26, 2014 (JP) ................................ 2014-063070

(51) Int. Cl.
| | |
|---|---|
| *H01H 25/06* | (2006.01) |
| *B62K 23/04* | (2006.01) |
| *H01H 25/00* | (2006.01) |
| *G05G 1/01* | (2008.04) |
| *G05G 1/02* | (2006.01) |
| *G05G 1/10* | (2006.01) |
| *B62K 11/14* | (2006.01) |
| *B62K 23/02* | (2006.01) |
| *G05G 9/047* | (2006.01) |

(52) U.S. Cl.
CPC .............. *B62K 23/04* (2013.01); *B62K 11/14* (2013.01); *B62K 23/02* (2013.01); *G05G 1/01* (2013.01); *G05G 1/02* (2013.01); *G05G 1/10* (2013.01); *G05G 9/04792* (2013.01); *H01H 25/008* (2013.01); *Y10T 74/20012* (2015.01)

(58) Field of Classification Search
CPC .. G05G 1/02; G05G 1/04; G05G 1/08; G05G 1/01; B62K 23/04; B62K 23/06; B62K 23/02; B62K 11/14; H01H 19/001; H01H 2009/068; H01H 2009/066; H01H 25/06; H01H 25/008
See application file for complete search history.

(56) References Cited

U.S. PATENT DOCUMENTS 2,993,972 A * 7/1961 Stewart ................ B23K 9/1087
200/302.1
6,227,068 B1 * 5/2001 Masui .................... B62K 23/02
200/61.85
(Continued)

FOREIGN PATENT DOCUMENTS

JP 2007-530335 A 11/2007
JP 2009-056872 A 3/2009
(Continued)

*Primary Examiner* — Felix O Figueroa
(74) *Attorney, Agent, or Firm* — Squire Patton Boggs (US) LLP

(57) ABSTRACT

An operation device of a straddle type vehicle has a controller used to operate at least two or more kinds of functions of equipment mounted on the straddle type vehicle. The controller includes a controller operation portion capable of rotary and other freely moving operations. A rotary shaft of the controller inside the controller operation portion is arranged lower than a lower wall face of a switch box.

11 Claims, 10 Drawing Sheets

(56) References Cited

U.S. PATENT DOCUMENTS

| | | | | |
|---|---|---|---|---|
| 6,571,902 B2* | 6/2003 | Heyne | ............... | A01B 63/10 |
| | | | | 180/321 |
| 6,698,307 B2* | 3/2004 | Wesling | ............ | B62M 25/08 |
| | | | | 280/260 |
| 7,165,641 B2* | 1/2007 | Kitamura | ............ | B60L 1/16 |
| | | | | 180/206.2 |
| 7,402,767 B2* | 7/2008 | Tozuka | ............ | B62J 6/001 |
| | | | | 200/561 |
| 7,421,926 B2* | 9/2008 | Kawakami | ......... | B62K 23/06 |
| | | | | 74/502.2 |
| 7,779,724 B2* | 8/2010 | Fujii | ............ | B62M 25/08 |
| | | | | 192/217 |
| 2010/0059018 A1 | 3/2010 | Akatsuka | | |
| 2012/0138375 A1 | 6/2012 | Hughes | | |
| 2012/0218233 A1* | 8/2012 | Chun | ............ | H01H 19/11 |
| | | | | 345/184 |
| 2015/0274248 A1 | 10/2015 | Osanai et al. | | |

FOREIGN PATENT DOCUMENTS

| | | |
|---|---|---|
| JP | 2010-064618 A | 3/2010 |
| JP | 2011-194993 A | 10/2011 |
| JP | 2013-189023 A | 9/2013 |
| TW | 200307624 A | 12/2003 |
| WO | WO 2005/092698 A1 | 10/2005 |

* cited by examiner

OPERATION DEVICE OF STRADDLE TYPE VEHICLE

BACKGROUND

Field

The present invention relates to an operation device of a straddle type vehicle used for equipment operation such as operation of audio or a navigation system, switching of a meter display, and switching of traveling modes.

Description of the Related Art

As in Patent Document 1 (Published Japanese Translation of PCT International Application No. 2007-530335), a structure is proposed in which a dial-type operation ring rotating around the center axis of a handle bar is attached to a position on the inner side of a grip in the periphery of the handle bar. Normally, in a straddle type vehicle, a switch box including one or multiple controllers operated with the rider's finger is arranged adjacent to an inner end portion of a grip of a handle bar. Accordingly, in the case of the above Patent Document 1, the operation ring having a larger outer diameter than the grip is additionally provided between the inner end portion of the handle grip and the switch box. Hence, to operate the controller provided in the switch box, the finger holding the grip needs to be stretched over the operation ring to operate the controller, and thus operation of the controller is difficult.

In view of the above problem, Patent Document 2 (Japanese Patent Application Publication No. 2013-189023) discloses that a rotary controller capable of selecting function menus related to on-vehicle audio and navigation system is provided in a switch box. This facilitates operation such as selection of a function menu, without changing the operability of other switches in the switch box. However, in this case, an additional rotary controller is to be provided in a space among existing switches in the switch box. This limits freedom in arrangement, as well as requires consideration in operation to sensuously discriminate the rotary controller from other switches. The switch box will also be enlarged.

Meanwhile, Patent Document 3 (Japanese Patent Application Publication No. 2010-64618) discloses a switch that protrudes outward in the vehicle width direction from a lateral surface of a lower portion of a switch box, and is pressed toward the traveling direction of the vehicle with the thumb. In this case, the switch can be clearly discriminated from other switches, and is operable by just slightly stretching the thumb of the hand holding the handle grip.

When operating on-vehicle equipment, sometimes selection of a function menu and determination of the selected menu need to be operated with a single controller. However, two or more kinds of functions cannot be operated with the technique of the above Patent Document 3.

SUMMARY

Against this background, the present invention aims to provide an operation device of a straddle type vehicle that can favorably maintain operability of switches arranged in an existing switch box, facilitate discrimination from these switches, and facilitate operation of multiple functions such as selection of a function menu of on-vehicle equipment while keeping hold of a grip.

In some embodiments, an operation device of a straddle type vehicle includes a switch box having multiple switches, which is provided adjacent to and on the inner side in the axial direction of a grip portion, which is held by a rider and provided on both left and right ends of a handle bar extending in the left-right direction of the straddle type vehicle. A controller is used to operate at least two or more kinds of functions of equipment, and is mounted on the straddle type vehicle. The controller includes a controller operation portion capable of rotary and other freely moving operations. A rotary shaft of the controller is disposed inside the controller operation portion and is arranged lower than a lower wall face of the switch box.

In some embodiments, the rotary shaft of the controller extends substantially parallel to the lower wall face of the switch box.

In some embodiments, the rotary shaft of the controller extends substantially parallel to the extension direction of the grip portion of the handle bar.

In some embodiments, a supporting portion supports the controller and is provided with at least some of electronic components of the controller, extends downward from the lower wall face of the switch box at a position on the switch box close to the inner side in the vehicle width direction. The controller operation portion protrudes further outward in the vehicle width direction than the supporting portion below the lower wall face of the switch box.

In some embodiments, the rotary shaft of the controller extends downward from the lower wall face of the switch box. The outer diameter of the controller operation portion is longer than the axial length of the rotary shaft of the controller operation portion.

In some embodiments, the controller includes a supporting portion rotatably supporting the controller operation portion, and is provided with at least some of electronic components of the controller. The supporting portion is formed in a lower portion of the switch box, and is arranged such that at least a part of a component constituting another electrical switch, which has a controller inside the switch box, and is inserted into the supporting portion.

In some embodiments, the supporting portion is formed inside the inner diameter of the controller operation portion.

According to a first characteristic of the present invention, the controller operation portion of the controller used to select multiple function menus of equipment is arranged in a position different from multiple switches normally used in a straddle type vehicle and provided in the switch box. Hence, it is possible to prevent the rider from confusing operation of the multiple switches with operation of the controller operation portion. Since the rotary shaft of the controller inside the controller operation portion is arranged lower than the lower wall face of the switch box, the controller operation portion is arranged lower than the lower wall face, so that at least two or more kinds of functions (e.g., selection and determination of a function menu) can be operated with at least one finger while keeping hold of the grip portion. Additionally, operability of the multiple switches provided in the switch box can be maintained.

According to another characteristic of the present invention, since the rotary shaft of the controller extends substantially parallel to the lower wall face of the switch box, the rotary shaft can be extended substantially parallel to the lower wall face while being kept from extending downward, so that the controller operation portion can be expanded.

According to another characteristic of the present invention, since the rotary shaft of the controller extends substantially parallel to the extension direction of the grip portion of the handle bar, the rotary shaft can be extended substantially parallel to the extension direction of the grip portion while being kept from extending downward, so that the controller operation portion can be easily extended to a position easily operable with a finger of the hand holding the grip portion.

According to another characteristic of the present invention, since the controller operation portion and the supporting portion, which supports the controller and accommodates at least some of electronic components of the controller, are arranged side by side in the vehicle width direction, the entire controller and supporting portion can be configured compactly, and the controller operation portion can be extended outward in the vehicle width direction to a position operable by the rider, while being kept from extending downward.

According to another characteristic of the present invention, since the outer diameter of the controller operation portion is longer than the axial length of the rotary shaft of the controller operation portion, the controller operation portion can be formed in an appropriate size easily operable by rotation with the finger, while being kept from extending downward.

According to another characteristic of the present invention, at least a part of a component constituting another electrical switch, which has its controller inside the switch box, is inserted into the supporting portion, which rotatably supports the controller operation portion and accommodates at least some of electronic components of the controller. Hence, the component constituting the electrical switch can be arranged while utilizing space efficiently, so that enlargement in volume and height of the switch box can be suppressed.

According to another characteristic of the present invention, since the supporting portion is formed inside the outer diameter of the controller operation portion, the controller operation portion can be formed in a size easily operable by rotation with the finger, and the supporting portion can be formed compactly, so that the component constituting the other electrical switch can be arranged efficiently.

DETAILED DESCRIPTION

Hereinbelow, a detailed description is given of an operation device of a straddle type vehicle according to the present invention, by use of preferable embodiments and with reference to the accompanying drawings.

Figure 1:
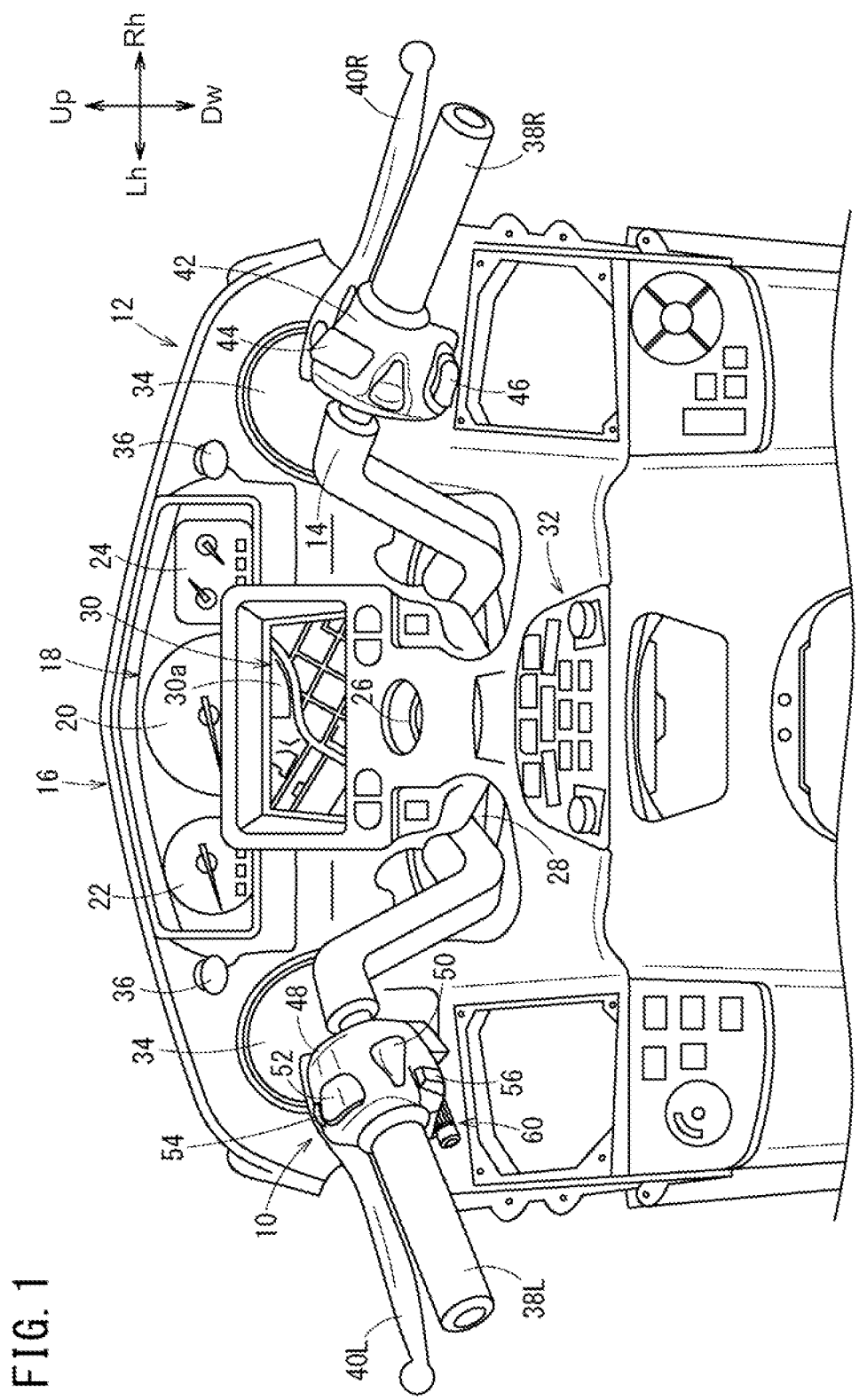
FIG. 1 is a partially enlarged view around a handle bar of a straddle type vehicle such as a motorcycle, which includes an operation device according to a first embodiment.

FIG. 1 is a partially enlarged view around a handle bar 14 of a straddle type vehicle 12 such as a motorcycle, which includes an operation device 10. FIG. 1 is a downward view of the periphery of the handlebar 14 as seen from the rear upper direction of the vehicle body, and is substantially the same state as seen from a rider sitting on an unillustrated seat of the straddle type vehicle 12. Note that the traveling direction of the straddle type vehicle 12 is regarded as the front, while left and right, as well as upper and lower directions are described on the basis of the directions seen from the rider sitting on the seat of the straddle type vehicle 12, if not stated otherwise.

The vehicle front side of the handle bar 14 steering an unillustrated front wheel of the straddle type vehicle 12 is covered with a front cowl 16, and a meter device (equipment) 18 is arranged in an upper part inside the front cowl 16. The meter device 18 includes: a tachometer 20 for displaying the number of revolutions of a drive source, such as an unillustrated engine or a motor; a speedometer 22 for displaying the speed of the straddle type vehicle 12; and gauges 24 including a fuel gauge and the like. The meter device 18 is a liquid crystal display, and is a so-called meter display whose screen display can be switched according to the rider's selection. Note that organic EL may be used instead of liquid crystal for the display. That is, the meter device 18 may be an organic EL display.

The front wheel is pivotally supported in a rotatable manner by unillustrated paired left and right front forks, and an upper portion of the paired left and right front forks is connected and fixed to a top bridge 28, to which a main switch 26 is attached. The top bridge 28 is rotatably attached to an unillustrated head pipe constituting a body frame, through an unillustrated steering stem. This handle bar 14 is fixed to an upper portion of the top bridge 28.

A display portion 30a of a navigation system (equipment) 30 is arranged in the upper center of the top bridge 28 at the rear of the meter device 18, while an audio unit (equipment) 32 including functions such as an FM/AM tuner, a digital audio player unit, and an amplifier is arranged on the rear side of the display portion. The display portion 30a is also used to display a song selected in the audio unit 32, or other function menus, for example. Mid-bass speakers 34, 34 for reproducing mid-bass tones from the audio unit 32 are arranged on the left and right of the meter device 18, and high-tone speakers 36, 36 for reproducing high tones are arranged between the speakers 34, 34 and the meter device 18.

Handle grips (grip portions) 38L, 38R to be held by the rider are attached to both left and right end portions of the handle bar 14. A front brake lever 40R is provided in front of the right handle grip 38R. The front brake lever 40R is a controller for applying a braking force to the front wheel according to the rider's manual operation. The right handle grip 38R is an accelerator controller for manually controlling the speed of the straddle type vehicle 12, and is supported so as to be rotatable around the handle bar 14. A clutch lever 40L is provided in front of the left handle grip 38L. The clutch lever 40L is a controller for disconnecting transmission of drive force of the drive source to a speed-change gear (not shown) according to the rider's manual operation. Specifically, transmission of drive force of the drive source to the speedchange gear is disconnected by operation of the clutch lever 40L, and drive force of the drive source is transmitted to the speed change gear by release of operation of the clutch lever 40L.

A switch box 42 arranged adjacent to the handle grip 38R on the inner side of the handle grip 38R in the axial direction, is provided on the right handle bar 14. Various electrical equipment switches, such as an engine stop switch 44 and a starter switch 46 are provided in the switch box 42. The engine stop switch 44 is a seesaw switch that maintains a position on the on or off side unless an operation force is applied, and brings the engine to an emergency halt when it is operated to the off side during operation of the drive source. The pressing type starter switch 46 is a controller for starting the engine, and starts the engine when it is operated while the main switch 26 is turned on and the speedchange gear is in the neutral state.

Figure 2:
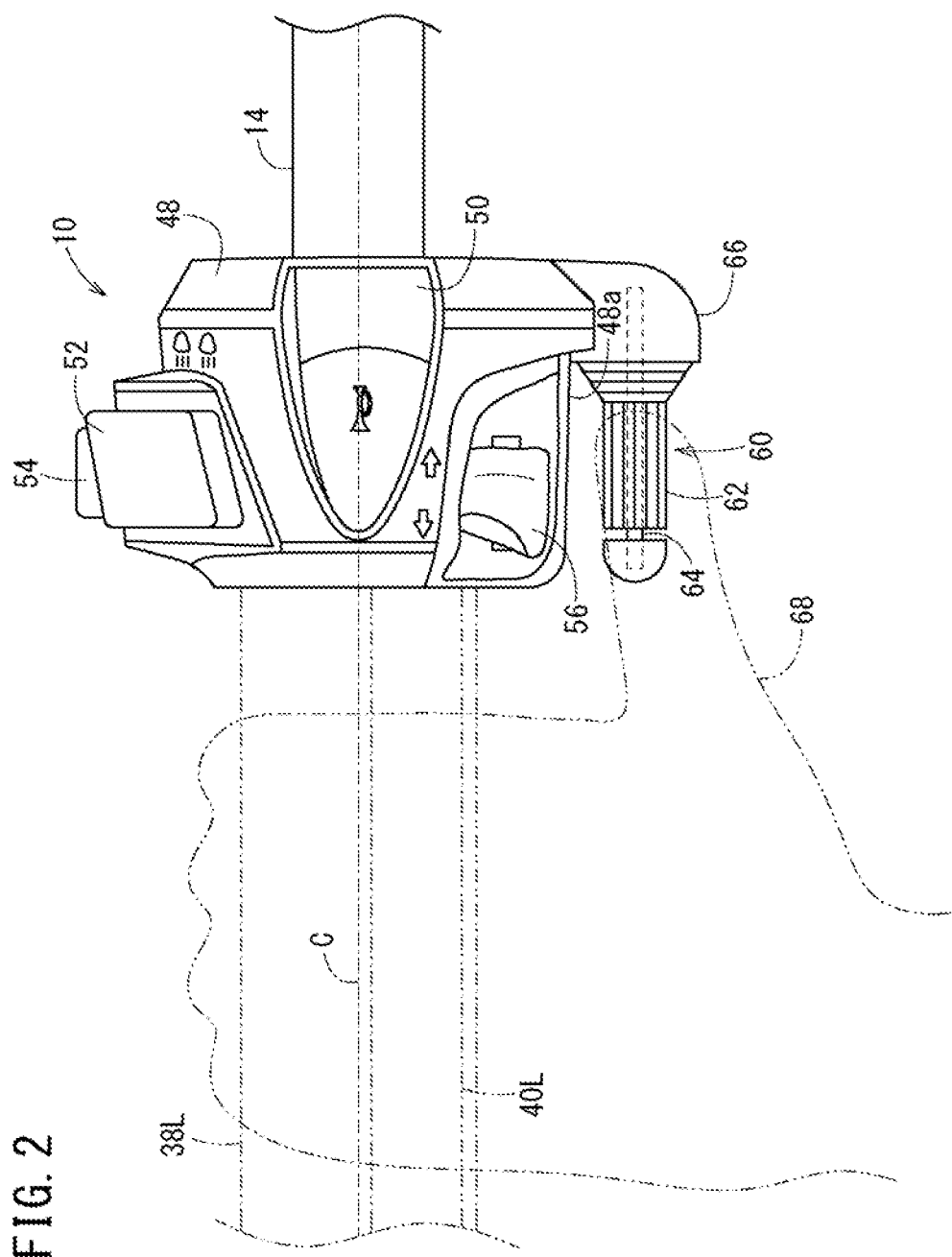
FIG. 2 is a rear view of the operation device shown in FIG. 1.

In addition, the operation device 10 of the present invention is provided on the left handle bar 14. As shown in FIG. 2, the operation device 10 has a switch box 48 provided on the left handle bar 14, adjacent to the handle grip 38L on the inner side of the handle grip 38L in the axial direction. Various electrical equipment switches (controllers), such as a horn switch 50, an optical axis shift switch 52, a hazard lamp switch 54, and a winker switch 56 are provided in the switch box 48.

The horn switch 50 is a pressing type switch for sounding an unillustrated horn of the straddle type vehicle 12, and is arranged at approximately the same height as an axis line C of the handle grip 38L (center axis of the handle bar 14) in the up-down direction of the vehicle body. The optical axis shift switch 52 is a seesaw switch for switching an unillustrated headlight of the straddle type vehicle 12 to low beam or high beam, and is arranged above the horn switch 50. The hazard lamp switch 54 is a locking type alternate switch for making an unillustrated hazard lamp of the straddle type vehicle 12 flash, and can be switched on and off by being retracted and projected. The hazard lamp switch 54 is arranged of the front side of the optical axis shift switch 52. The winker switch 56 is a switch operated by being tilted to the left and right to actuate an unillustrated direction indicator (winker lamp) of the straddle type vehicle 12, and is arranged below the horn switch 50. Note that the operation indicator may be used as the hazard lamp.

The operation device 10 has a controller 60 used for operation of two or more kinds of functions. For example, operation of two or more kinds of functions refers to selection and determination of a function menu of equipment such as the navigation system 30 and the audio unit 32, and selection and determination of a function menu for switching a display menu displayed on the meter device 18 or a function menu for displaying a setting menu of the vehicle. The controller 60 has a controller operation portion 62 capable of rotary and other freely moving operations. A rotary shaft 64 of the controller 60 (the rotary shaft 64 inside the controller operation portion 62 is indicated by a broken line in FIG. 2) allowing rotation of the controller operation portion 62 is arranged lower than a lower wall face 48a of the switch box 48. Accordingly, the controller operation portion 62 is arranged lower than the lower wall face 48a of the switch box 48. The rotary shaft 64 extends at least along the vehicle width direction. Hence, the controller operation portion 62 rotates in the up-down direction. Note that the rotary shaft 64 preferably extends substantially parallel to the lower wall face 48a of the switch box 48, and preferably extends substantially parallel to the extension direction of the handle grip 38L of the handle bar 14.

Figure 3:
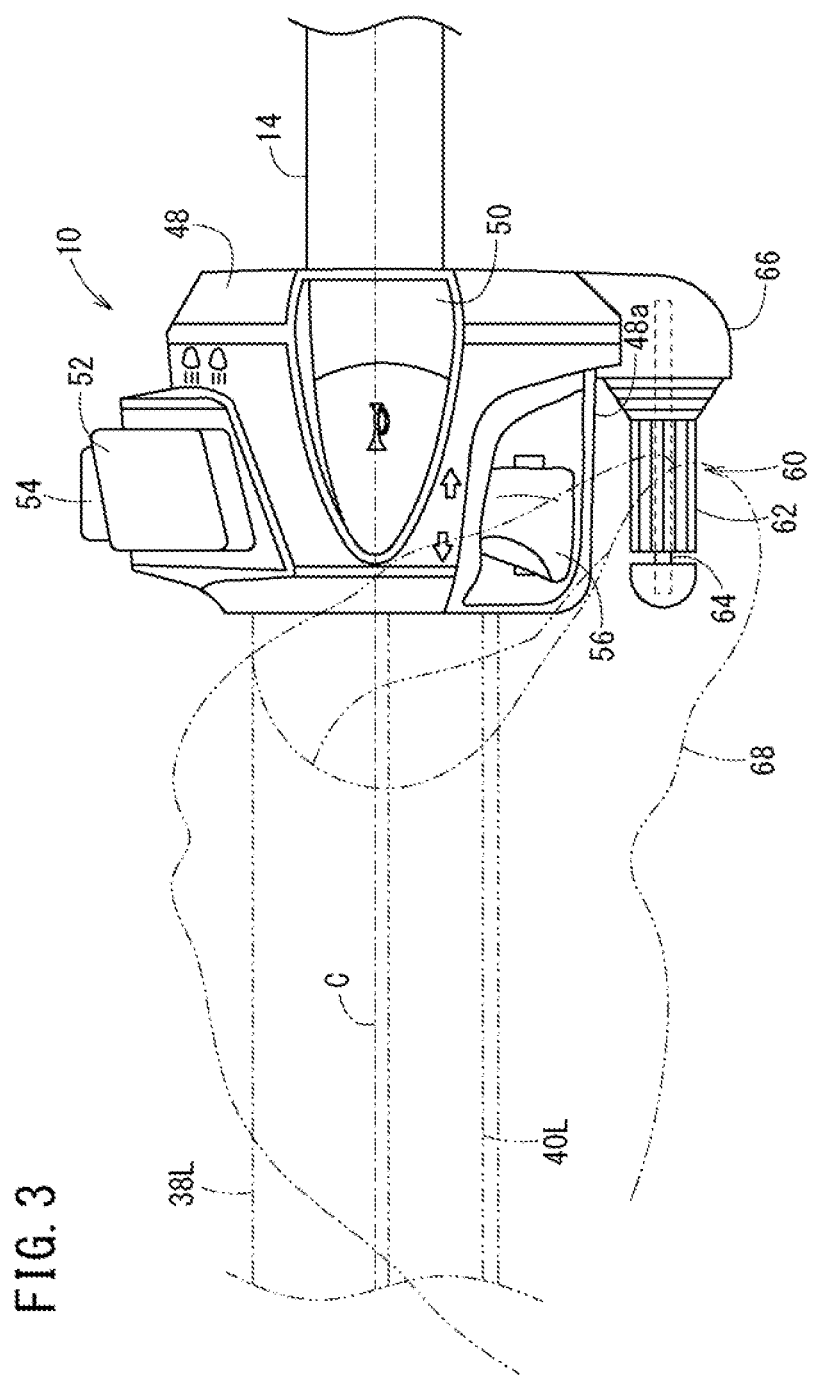
FIG. 3 is a view showing another operation example of a controller operation portion shown in FIG. 2.

The controller 60 is supported by a controller supporting portion (supporting portion) 66 provided on the lower side of the lower wall face 48a of the switch box 48. The controller supporting portion 66 accommodates at least some of electronic components of the controller 60. The controller supporting portion 66 protrudes downward from the lower wall face 48a of the switch box 48, at a position on the switch box 48 close to the inner side in the vehicle width direction. Accordingly, the controller 60 can be arranged below the lower wall face 48a of the switch box 48, such that the controller operation portion 62 protrudes further outward in the vehicle width direction than the controller supporting portion 66 below the lower wall face 48a of the switch box 48. With this, the rider can operate the controller operation portion 62 with the left thumb while keeping hold of the handle grip 38L. As another operation example, the controller operation portion 62 may be operated by stretching the index finger downward while keeping hold of the handle grip 38L, and nipping with the index finger and thumb as in FIG. 3. Note that the controller supporting portion 66 may be provided integrally with the switch box 48.

Figure 4:
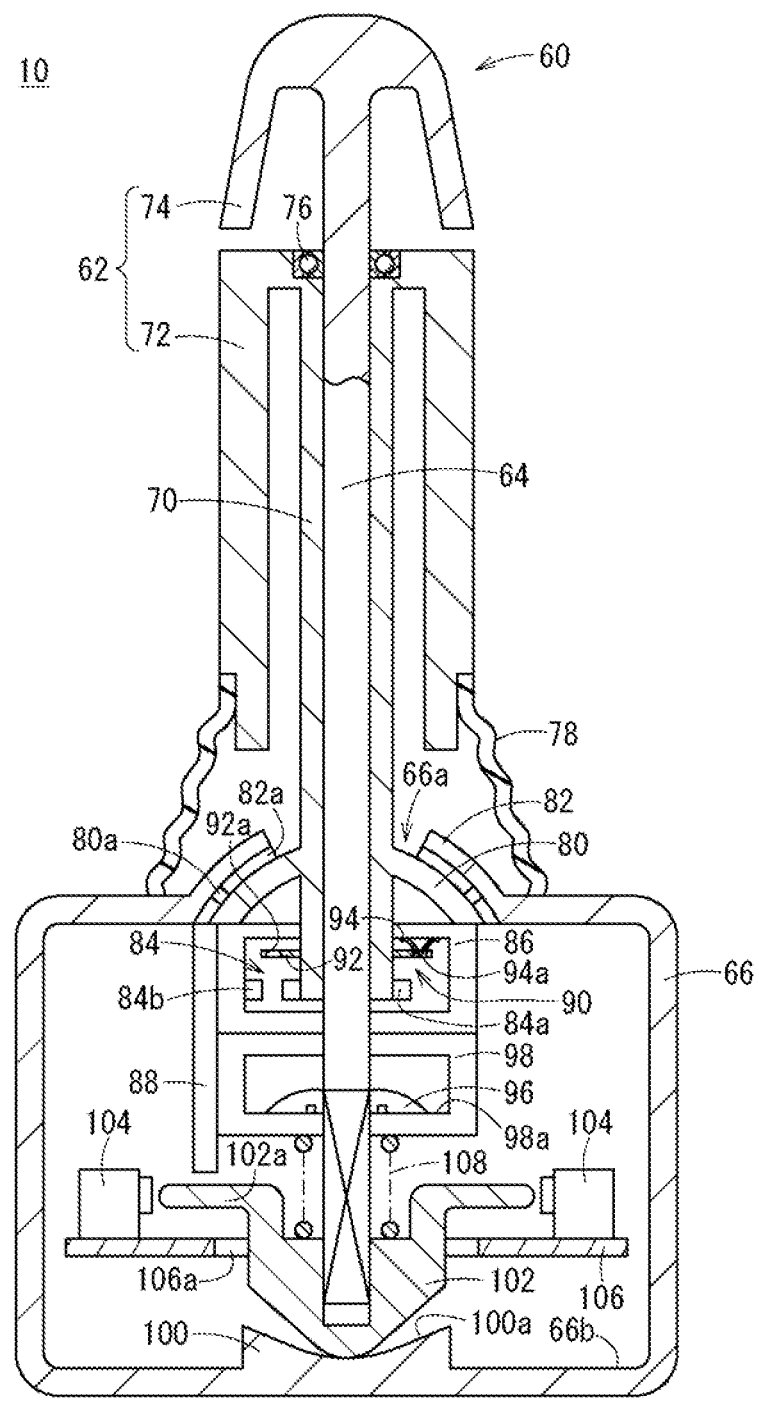
FIG. 4 is a cross-sectional view showing a configuration of a controller and a controller-supporting portion shown in FIG. 1.

FIG. 4 is a cross-sectional view showing a configuration of the controller 60 and the controller supporting portion 66. The controller 60 has the controller operation portion 62, the rotary shaft 64, and a hollow portion 70 rotatable around the rotary shaft 64. The controller operation portion 62 has a first controller 72 capable of rotary and tilting operations, and a second controller 74 capable of pressing and tilting operations. The rotary shaft 64 is provided so as to penetrate the hollow portion 70, and is movable in the axial direction with respect to the hollow portion 70. The first controller 72 has a cylindrical shape, and is provided in the hollow portion 70 so as to cover the outer circumferential surface of the hollow portion 70. Hence, the first controller 72 (controller operation portion 62) functions as a rotary controller. Meanwhile, the second controller 74 is formed into a substantially hemispherical shape covering a tip end portion of the rotary shaft 64, and is provided on the tip end of the rotary shaft 64.

The hollow portion 70 and the first controller 72 are connected on the tip end side (outside in the vehicle width direction), while the proximal end sides are opened. A sealed bearing 76, which prevents water, dust and the like from entering a part between the hollow portion 70 and the rotary shaft 64, and allows the hollow portion 70 to rotate around the rotary shaft 64, is provided on the tip end side of the hollow portion 70.

The proximal end sides of the rotary shaft 64 and the hollow portion 70 are inserted into the box-shaped controller supporting portion 66, and the first controller 72 is provided between the second controller 74 and the controller supporting portion 66. The rotary shaft 64 is inserted further into the controller supporting portion 66 than the hollow portion 70. The radius of the second controller 74 on the proximal end side has the same length as the radius of the first controller 72. This enhances design. Reference numeral 78 indicates a bellows type rubber seal. The rubber seal 78 prevents water, dust and the like from entering a gap formed between the proximal end side of the first controller 72 and the controller supporting portion 66, and is provided between the proximal end side of the first controller 72 and the controller supporting portion 66.

A hemispherical body 80 is provided in the hollow portion 70 inside the controller supporting portion 66, and a hemispherical body 82 formed so as to receive the spherical surface of the hemispherical body 80 is formed in the controller supporting portion 66. The hemispherical body 82 is formed around an insertion hole 66a of the controller supporting portion 66, into which the rotary shaft 64 and the hollow portion 70 are inserted. The hemispherical bodies 80, 82 are provided to support the rotary shaft 64 in a tiltable manner. A pin 80a is provided in the spherical surface of the hemispherical body 80, while a groove 82a with which the pin 80a engages is provided in the inner face of the hemispherical body 82. Movement of the pin 80a inside the groove 82a causes the rotary shaft 64 to tilt within a predetermined range. Since the second controller 74 is tilted together with tilting of the rotary shaft 64, the second controller 74 (controller operation portion 62) functions as a tilting controller. Additionally, since the first controller 72 is tilted together with tilting of the rotary shaft 64, the first controller 72 is also tiltable with the finger placed thereon, and thus the first controller 72 functions as a tilting controller.

The controller 60 has a rotation angle detector (electronic component) 84 for detecting the rotation angle of the hollow portion 70 (first controller 72). The rotation angle detector 84 is held by a holding member 86 provided in a lower portion of the hollow portion 70. The rotation angle detector 84 is provided below the hemispherical body 80. The rotation angle detector 84 is configured of a magnet 84a having S and N polarities and provided on the outer circumference of a lower portion of the hollow portion 70, and a hall effect sensor 84b, which is a magnetic sensor provided in the holding member 86. The rotation angle of the hollow portion 70 (first controller 72) can be detected through detection of change in the polarity of the magnet 84a by the Hall effect sensor 84b. A signal detected by the Hall effect sensor 84b is transmitted to the outside through a substrate (electronic component) 88 of the controller 60.

A click mechanism 90 for generating a clicking sense at every constant angle in the rotary operation of the controller operation portion 62 is provided in a lower portion of the hollow portion 70. A clicking sense refers to a sound, feeling or the like caused by pressing a switch. The click mechanism 90 has a circular flange portion 92 provided in the lower portion of the hollow portion 70, and a flat spring 94. The flange portion 92 and the flat spring 94 are provided so as to face each other. The flange portion 92 is provided in the hollow portion 70. Hence, the flange portion 92 rotates together with the rotation of the hollow portion 70 (first controller 72). The flat spring 94 is attached to the holding member 86.

Multiple opening portions 92a are provided in a penetrating manner on an outer circumference end portion of the flange portion 92, along the outer circumferential surface of the flange portion 92. The multiple opening portions 92a are spaced apart at constant angle intervals so as to form a circle, by using the center of the circular flange portion 92 as a reference point. The flat spring 94 has a protruding portion 94a protruding from its center toward the flange portion 92.

When the opening portion 92a of the flange portion 92 faces the protruding portion 94a, the protruding portion 94a is inserted into the opening portion 92a. Meanwhile, when a part other than the opening portion 92a of the flange portion 92 faces the protruding portion 94a, the protruding portion 94a is pressed against the biasing force of the flat spring 94. Thus, rotation of the hollow portion 70 (first controller 72) causes the flat spring 94 to generate a clicking sense at every constant angle.

A holding member 98 for holding a metal spring armature 96 is provided below the holding member 86. The holding members 86, 98 are attached to a substrate 88 provided along the axial direction of the rotary shaft 64. The metal spring armature 96 gives the rotary shaft 64 a biasing force toward the tip end side in the axial direction of the rotary shaft 64. A contact point is formed in a surface 98a of the holding member 98 facing the metal spring armature 96. By pressing the second controller 74 in the axial direction (from the tip end side toward the proximal end side), the rotary shaft 64 is slid relative to the hollow portion 70 to crush the metal spring armature 96, and the contact point formed in the surface 98a is electrically connected. Thus, a connection point signal is transmitted to the outside through the substrate 88. The second controller 74 (controller operation portion 62) also functions as a push button (pushing controller). Note that a predetermined gap is formed between the proximal end of the second controller 74 and the tip end of the first controller 72, to prevent interference between the second controller 74 and the first controller 72 when the second controller 74 is pressed in the axial direction of the rotary shaft 64. The metal spring armature 96 and the surface 98a constitute electronic components of the controller 60.

A bottom face 66b of the controller supporting portion 66 has a slide face 100a curved in a bowl shape, and is provided with a supporting portion 100 for supporting the rotary shaft 64 in a tiltable manner. A proximal end portion of the rotary shaft 64 having penetrated the holding members 86, 98 is provided with a sliding portion 102 abutting on the slide face 100a. Specifically, when the rotary shaft 64 is tilted, the sliding portion 102 slides on the slide face 100a. The sliding portion 102 has a flange 102a spreading outward around the rotary shaft 64. Push buttons (electronic component) 104 of the controller 60 are arranged in crossed directions opposite to the flange portion 102a. The buttons 104 are mounted on a substrate (electronic component) 106 of the controller 60. Accordingly, by tilting the controller operation portion 62 in crossed directions, the button 104 arranged in the tilted direction is pressed, and a contact point signal is transmitted to the outside through the substrate 106.

Note that a hole 106a for avoiding interference with the sliding portion 102 is formed in the substrate 106, and the tip end portion of the sliding portion 102 abuts on the slide face 100a after penetrating this hole 106a. Additionally, a spring 108 is provided between the sliding portion 102 and the holding member 98. The spring 108 generates a return force for maintaining the vertical position (initial position) of the rotary shaft 64 by pressing the sliding portion 102 against the sloped slide face 100a.

With this configuration of the controller 60, the controller operation portion 62 can be tilted in crossed directions, be rotated, and function as a press button. The controller 60 has a selection function, in which function menus to be selected are switched through scrolling, by rotating the controller operation portion 62 (first controller 72) in first and second directions. The first and second directions are rotation directions opposite from each other.

Additionally, the controller 60 has a determination function, in which the selected function menu is determined by moving the controller operation portion 62 in a third direction different from the first and second directions. To be specific, the selected function menu can be determined by tilting the controller operation portion 62 in any of crossed directions, or pressing the controller operation portion 62 in the axial direction toward the controller supporting portion 66 side.

Figure 5:
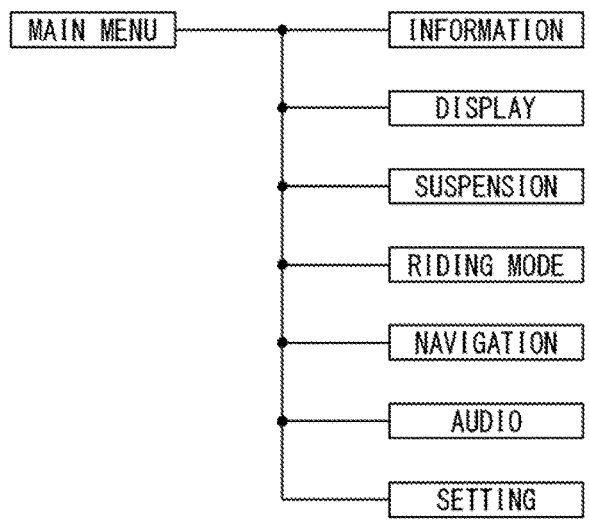
FIG. 5 is a view showing the hierarchy of function menus of equipment such as a navigation system and an audio unit, displayed on a display portion.

FIG. 5 is a view showing the hierarchy of function menus of equipment such as the navigation system 30 and the audio unit 32, displayed on the display portion 30a. When the controller operation portion 62 is operated in the third direction while "MAIN MENU," which is a function menu displayed on the display portion 30a, is selected, selection of "MAIN MENU" is determined. When selection of "MAIN MENU" is determined, "INFORMATION," "DISPLAY," "SUSPENSION," "RIDING MODE," "NAVIGATION,"

"AUDIO," and "SETTING," which are lower-level function menus than "MAIN MENU," are displayed on the display portion 30a.

"INFORMATION" is a function menu for displaying various information related to traveling, "DISPLAY" is a function menu for switching the display menu displayed on the meter device 18, and "SUSPENSION" is a function menu for displaying setting information related to suspension, such as damping force and vehicle height. "RIDING MODE" is a function menu for displaying states related to output characteristics of the engine, such as power traveling mode and wet weather traveling mode, and "NAVIGATION" is a function menu for displaying various information by the navigation system 30. "AUDIO" is a function menu for displaying audio information, and "SETTING" is a function menu for displaying states set for various equipment.

Then, the cursor position indicating the selected function menu is scrolled, by operating and rotating the first controller 72 of the controller operation portion 62. For example, when the first controller 72 is rotated in the first direction, the cursor position is scrolled forward through the function menus, i.e., in the order of "INFORMATION"→"DISPLAY"→"SUSPENSION"→"RIDING MODE"→"NAVIGATION"→"AUDIO"→"SETTING"→"INFORMATION." On the other hand, when the first controller 72 is rotated in the second direction, the cursor position is scrolled backward through the function menus, i.e., in the order of "INFORMATION"→"SETTING"→"AUDIO"→"NAVIGATION"→"RIDING MODE"→"SUSPENSION"→"DISPLAY"→"INFORMATION." The cursor position is switched according to rotation angles detected by the rotation angle detector 84. In other words, the displayed cursor position changes every time the rotation angle detector 84 detects rotation at a predetermined angle. Thus, any function menu can be selected easily from among multiple function menus.

Then, when the controller operation portion 62 is operated in the third direction while any of "INFORMATION," "DISPLAY," "SUSPENSION," "RIDING MODE," "NAVIGATION," "AUDIO," and "SETTING" is selected, information on the selected function menu is displayed.

Note that the controller 60 may have a function of resuming a home screen (initial screen) of a function menu by operating the controller operation portion 62 in a fourth direction different from any of the first to third directions. For example, if a direction in which the controller operation portion 62 is tilted is set as the third direction, a direction in which the controller operation portion 62 is pressed toward the controller supporting portion 66 side may be set as the fourth direction. Otherwise, if directions in which the controller operation portion 62 is tilted in cross directions are set as the third and fourth directions, different tilt directions are set as the third and fourth directions. The screen displayed on the display portion 30a or the meter device 18 returns to the home screen by operating the controller operation portion 62 in the fourth direction.

As has been described, in the first embodiment, the controller operation portion 62 of the controller 60 used to select multiple function menus of equipment, such as the navigation system 30 and the audio unit 32, is arranged in a position different from multiple switches normally used in the straddle type vehicle 12 and provided in the switch box 48. Hence, it is possible to prevent the rider from confusing operation of the multiple switches in the switch box 48 with operation of the controller operation portion 62.

In addition, the rotary shaft 64 of the controller 60 inside the controller operation portion 62 is arranged lower than the lower wall face 48a of the switch box 48. Accordingly, the controller operation portion 62 is arranged lower than the lower wall face 48a, so that at least two or more kinds of functions (selection and determination of a function menu) can be operated with at least one finger (e.g., the thumb) while keeping hold of the handle grip 38L. Additionally, operability of the multiple switches provided in the switch box 48 can be maintained.

The rotary shaft 64 of the controller 60 extends substantially parallel to the lower wall face 48a of the switch box 48. This allows the rotary shaft 64 to extend substantially parallel to the lower wall face 48a while keeping it from extending downward, so that the controller operation portion 62 can be expanded. Also, the rotary shaft 64 of the controller 60 extends substantially parallel to the extension direction of the handle grip 38L of the handle bar 14. This allows the rotary shaft 64 to extend substantially parallel to the extension direction of the handle grip 38L while keeping it from extending downward, so that the controller operation portion 62 can be easily extended to a position easily operable with a finger of the hand holding the handle grip 38L.

The controller operation portion 62 and the controller supporting portion 66, which supports the controller 60 and accommodates at least some of the electronic components of the controller 60, are arranged side by side in the vehicle width direction below the switch box 48. This allows the entire controller 60 and controller supporting portion 66 to be configured compactly, and also allows the controller operation portion 62 to be extended outward in the vehicle width direction to a position operable by the rider, while keeping it from extending downward.

Figure 6:
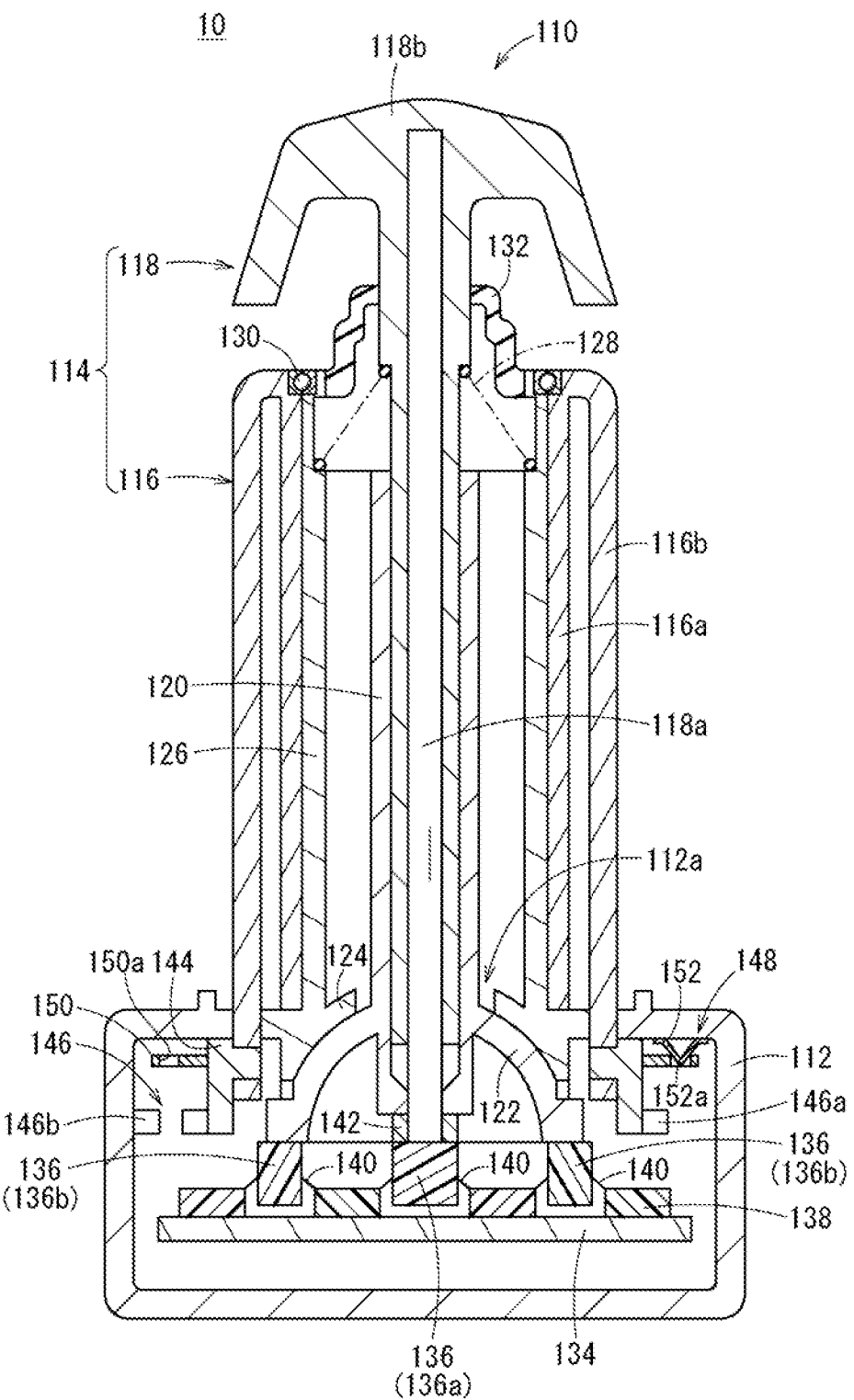
FIG. 6 is a cross-sectional view showing a configuration of a controller and a controller-supporting portion of a second embodiment.

In a second embodiment, an operation device 10 has a controller 110 and a controller supporting portion (supporting portion) 112 configured as in FIG. 6, in place of the controller 60 and the controller supporting portion 66 of the first embodiment. Hereinbelow, a detailed description is given of the controller 110 and the controller supporting portion 112. The controller supporting portion 112 accommodates at least some of electronic components of the controller 110. Note that the controller supporting portion 112 may be provided integrally with the switch box 48.

The controller 110 includes a controller operation portion 114. The controller operation portion 114 has a first operation portion 116 capable of rotary operation, and a second operation portion 118 capable of pressing and tilting operations. The second operation portion 118 has an operation shaft 118a, and a second controller 118b, which is formed into a substantially hemispherical shape covering a tip end portion of the operation shaft 118a and capable of tilting and pressing operations.

The operation shaft 118a penetrates a cylindrical portion 120 so as to be slidable in the axial direction. The proximal end sides of the operation shaft 118a and the cylindrical portion 120 are inserted into the box-shaped controller supporting portion 112. A hemispherical body 122 is provided in the cylindrical portion 120 inside the controller supporting portion 112. A spherical surface-receiving portion 124 formed so as to receive the spherical surface of the hemispherical body 122 is formed in the controller supporting portion 112. The spherical surface-receiving portion 124 is formed around an insertion hole 112a of the controller supporting portion 112, into which the operation shaft 118a and the cylindrical portion 120 are inserted. The hemispherical body 122 and the spherical surface-receiving portion 124 are provided to support the operation shaft 118a in a tiltable manner.

The first operation portion 116 is rotatable around a rotary shaft 126 of the controller 110. The rotary shaft 126 is formed so as to extend upward from a part of the spherical surface-receiving portion 124 of the controller supporting portion 112. The rotary shaft 126 has a hollow shape, and the operation shaft 118a as will as the cylindrical portion 120 are provided inside the hollow space of the rotary shaft 126. Hence, the operation shaft 118a is tiltable inside the hollow space of the rotary shaft 126. Additionally, a spring 128 for maintaining the vertical position (initial position) of the operation shaft 118a is provided between the rotary shaft 126 and the operation shaft 118a.

The first operation portion 116 is formed such that the rotary shaft 126 penetrates therethrough, and has a hollow portion 116a rotatable around the rotary shaft 126, as well as a cylindrical first controller 116b that covers the outer circumferential surface of the hollow portion 116a and is capable of rotary operation. The hollow portion 116a and the first controller 116b are connected on the tip end side, while the proximal end sides are opened. A sealed bearing 130, which prevents water, dust and the like from entering a part between the hollow portion 116a and the rotary shaft 126, and allows the hollow portion 116a to rotate around the rotary shaft 126, is provided on the tip end side of the hollow portion 116a. A bellows type rubber seal 132 for preventing water, dust and the like is provided between the tip end side of the rotary shaft 126 and the operation shaft 118a. The radius of the second controller 118b on the proximal end side has the same length as the radius of the first controller 116b. This enhances design.

A substrate (electronic component) 134 of the controller 110 is provided inside the controller supporting portion 112, and a flexible sheet 138 on which multiple buttons (electronic component) 136 are formed is laminated to the upper face of the substrate 134. The multiple buttons 136 are integrally formed with, and formed in an upper portion of, a dome 140 provided in an upward protruding manner in the sheet 138. A contact point formed in the substrate 134 is electrically connected by pressing the button 136. Thus, a connection point signal is transmitted to the outside through the substrate 134. The button 136 is a conventionally known button.

The buttons 136 formed on the sheet 138 include a button 136a arranged below the operation shaft 118a, and four buttons 136b arranged below the edge of opening end of the hemispherical body 122. The four buttons 136b arranged below the edge of opening end of the hemispherical body 122 are arranged in crossed directions. By tilting the second operation portion 118 in the crossed direction, the button 136b in the tilted direction is pressed. Additionally, by pressing the second operation portion 118 in the axial direction toward the controller supporting portion 112, the operation shaft 118a is slid relative to the cylindrical portion 120 to press the button 136a. Incidentally, a retaining ring 142 is fitted into the proximal end of the operation shaft 118a. Note that a predetermined gap is formed between the proximal end of the second controller 118b and the tip end of the first controller 116b, to prevent interference between the second controller 118b and the first controller 116b when the controller operation portion 114 is pressed in the axial direction of the operation shaft 118a.

A proximal end portion of the first controller 116b is inserted into the controller supporting portion 112, and a retaining portion 144 for preventing the first controller 116b from coming off is engaged with the proximal portion of the first controller 116b. A rotation angle detector (electronic component) 146 of the controller 110, which detects the rotation angle of the first operation portion 116, is provided inside the controller supporting portion 112. The rotation angle detector 146 is configured of a magnet 146a having S and N polarities and provided on the outer circumference of the retaining portion 144, and a hall effect sensor 146b, which is a magnetic sensor provided in the controller supporting portion 112. The rotation angle of the first operation portion 116 (retaining portion 144) can be detected through detection of change in the polarity of the magnet 146a by the Hall effect sensor 146b. A signal detected by the Hall effect sensor 146b is transmitted to the outside through the substrate 134.

A click mechanism 148 for generating a clicking sense at every constant angle in the rotary operation of the first operation portion 116 is provided inside the controller supporting portion 112. The click mechanism 148 has a circular flange portion 150 provided in the retaining portion 144, and a flat spring 152. The flange portion 150 and the flat spring 152 are provided so as to face each other. The flange portion 150 rotates together with the rotation of the retaining portion 144. The flat spring 152 is attached to an inner wall of the controller supporting portion 112.

Multiple opening portions 150a are provided in a penetrating manner on an outer circumference end portion of the flange portion 150, along the outer circumferential surface of the flange portion 150. The multiple opening portions 150a are spaced apart at constant angle intervals so as to form a circle, by using the center of the circular flange portion 150 as a reference point. The flat spring 152 has a protruding portion 152a protruding from its center toward the flange portion 150.

When the opening portion 150a of the flange portion 150 faces the protruding portion 152a, the protruding portion 152a is inserted into the opening portion 150a. Meanwhile, when a part other than the opening portion 150a of the flange portion 150 faces the protruding portion 152a, the protruding portion 152a is pressed against the biasing force of the flat spring 152. Thus, rotation of the retaining portion 144 (first operation portion 116) causes the flat spring 152 to generate a clicking sense at every constant angle.

With this configuration of the controller 110, the controller operation portion 114 can be tilted in crossed directions, be rotated, and function as a press button. The controller 110 has a selection function, in which function menus to be selected are switched through scrolling forward and backward, by rotating the controller operation portion 114 (first operation portion 116) in first and second directions. The first and second directions are rotation directions opposite from each other.

Additionally, the controller 110 has a determination function, in which the selected function menu is determined by moving the controller operation portion 114 in a third direction different from the first and second directions. To be specific, the selected function menu can be determined by tilting the controller operation portion 114 (second operation portion 118) in any of crossed directions, or pressing the controller operation portion 114 (second operation portion 118) in the axial direction toward the controller supporting portion 112 side.

Note that the controller 110 may have a function of resuming a home screen (initial screen) of a function menu by operating the controller operation portion 114 in a fourth direction different from any of the first to third directions. For example, if a direction in which the controller operation portion 114 (second operation portion 118) is tilted is set as the third direction, a direction in which the controller operation portion 114 (second operation portion 118) is pressed in the axial direction toward the controller supporting portion 112 side may be set as the fourth direction. Otherwise, if directions in which the controller operation portion 114 (second operation portion 118) is tilted in cross directions are set as the third and fourth directions, different tilt directions may be set as the third and fourth directions.

As in the case of the first embodiment, in the controller 110 of the second embodiment, the rotary shaft 126 of the controller 110 allowing rotation of the controller operation portion 114 (first operation portion 116) is arranged lower than a lower wall face 48a of a switch box 48. Accordingly, the controller operation portion 114 is arranged lower than the lower wall face 48a of the switch box 48. The rotary shaft 126 extends at least along the vehicle width direction. Hence, the controller operation portion 114 (first operation portion 116) rotates in the up-down direction. Note that the rotary shaft 126 preferably extends substantially parallel to the lower wall face 48a of the switch box 48, and preferably extends substantially parallel to the extension direction of a handle grip 38L of a handle bar 14. Also, the controller supporting portion 112 protrudes downward from the lower wall face 48a of the switch box 48, at a position on the switch box 48 close to the inner side in the vehicle width direction. Accordingly, the controller 110 can be arranged below the lower wall face 48a of the switch box 48, such that the controller operation portion 114 protrudes further outward in the vehicle width direction than the controller supporting portion 112 below the lower wall face 48a of the switch box 48. With this, the rider can operate the controller operation portion 114 with the left thumb while keeping hold of the handle grip 38L, or by nipping the controller operation portion 114 with the left index finger and thumb.

Effects similar to those of the first embodiment can be achieved by the second embodiment.

Figure 7:
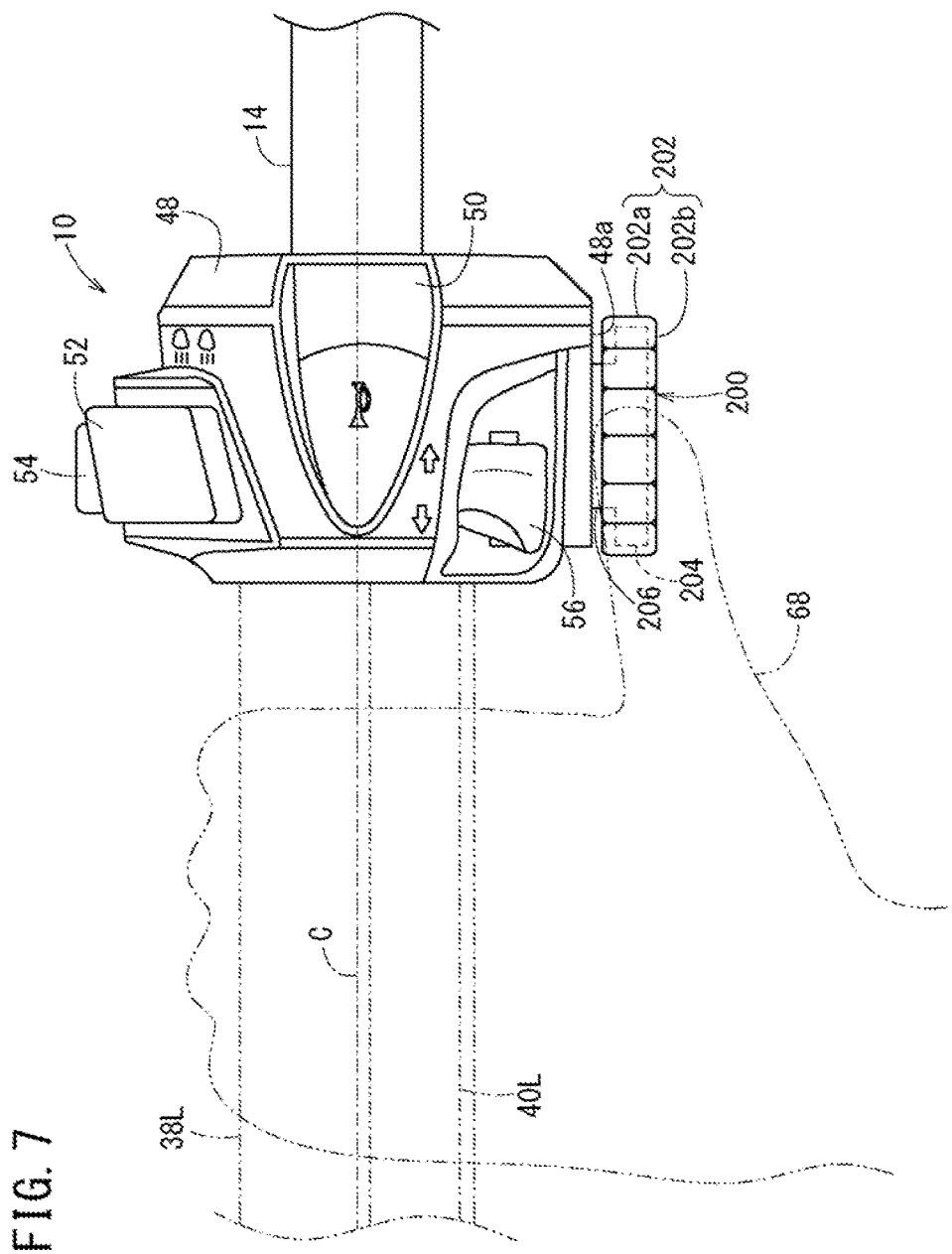
FIG. 7 is a rear view of an operation device of a third embodiment.

In a third embodiment, an operation device 10 has a controller 200 as shown in FIG. 7, in place of the controller 60 of the first embodiment. Hereinbelow, a detailed description is given of the controller 200. Note that in the third embodiment, a configuration similar to that of the first embodiment is assigned the same reference numeral, and description thereof will be omitted unless otherwise required.

The controller 200 used for operating two or more kinds of functions has a cylindrical controller operation portion 202 capable of rotary and other freely moving operations. A rotary shaft 204 of the controller 200 allowing rotation of the controller operation portion 202 extends downward from a lower wall face 48a of the switch box 48, and thus the rotary shaft 204 inside the controller operation portion 202 is positioned lower than the lower wall face 48a. Accordingly, the controller operation portion 202 is arranged lower than the lower wall face 48a of the switch box 48. With this, the rider can operate the controller operation portion 202 with the left thumb while keeping hold of a handle grip 38L. Additionally, since the rotary shaft 204 extends downward from the lower wall face 48a of the switch box 48, the controller operation portion 202 rotates in the left-right direction. The controller operation portion 202 is configured of a controller operation portion-main body 202a constituting the outer circumferential surface of the controller operation portion 202, and a bottom cover 202b positioned in its lower bottom portion. The bottom cover 202b is fitted into the controller operation portion-main body 202a so as to cover the rotary shaft 204 from below. The outer diameter of the controller operation portion 202 is longer than the axial length of the rotary shaft 204 of the controller operation portion 202.

Figure 8:
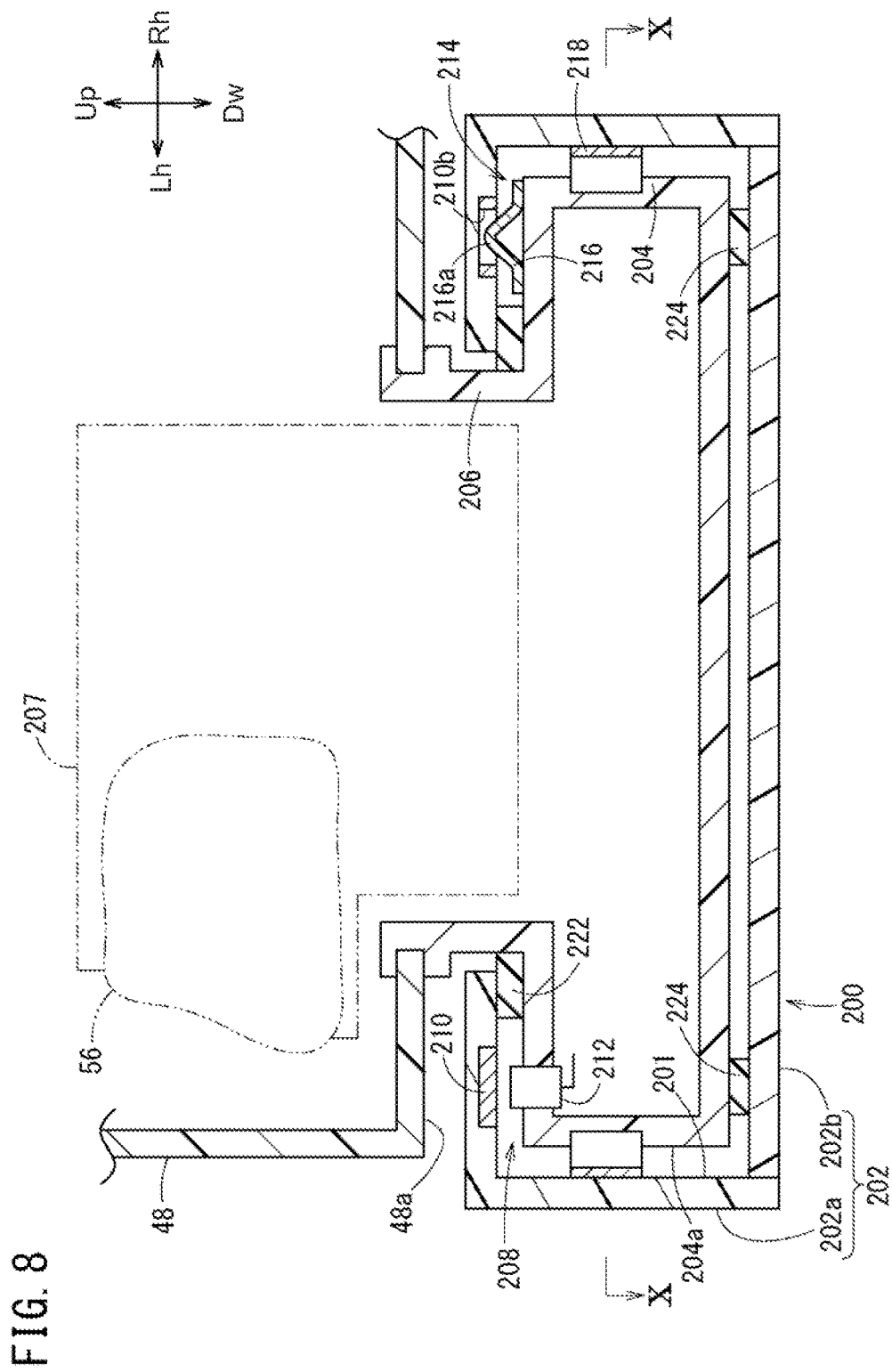
FIG. 8 is a cross-sectional view showing a configuration of a controller of the third embodiment.

FIG. 8 is a cross-sectional view showing a configuration of the controller 200. The controller 200 has the controller operation portion 202, as well as a supporting portion 206 that rotatably supports the controller operation portion 202 and accommodates at least some of electronic components of the controller 200. The controller operation portion 202 functions as a rotary controller. The supporting portion 206 includes the rotary shaft 204, and is arranged inside the inner diameter of the controller operation portion 202. The supporting portion 206 and the rotary shaft 204 form a single unit. The supporting portion 206 has its upper portion attached to the lower wall face 48a of the switch box 48, and has its lower portion integrally formed with the rotary shaft 204. The rotary shaft 204 and the supporting portion 206 have cylindrical shapes, and the outer diameter of the rotary shaft 204 is smaller than the inner diameter of the controller operation portion 202. In addition, the lower end of the rotary shaft 204, which is formed integrally with the supporting portion 206, is positioned higher than the lower end of the controller operation portion 202. To be specific, the rotary shaft 204 is formed smaller than the controller operation portion 202, in such a manner as to be covered with the controller operation portion 202 from below.

At least a part of a component constituting another electrical switch, which has its controller inside the switch box 48, is arranged in such a manner as to be inserted into the supporting portion 206. In the third embodiment, a component 207 constituting an electrical switch, which has a winker switch 56 inside the switch box 48, is arranged in such a manner as to be inserted into the supporting portion 206.

Figure 9:
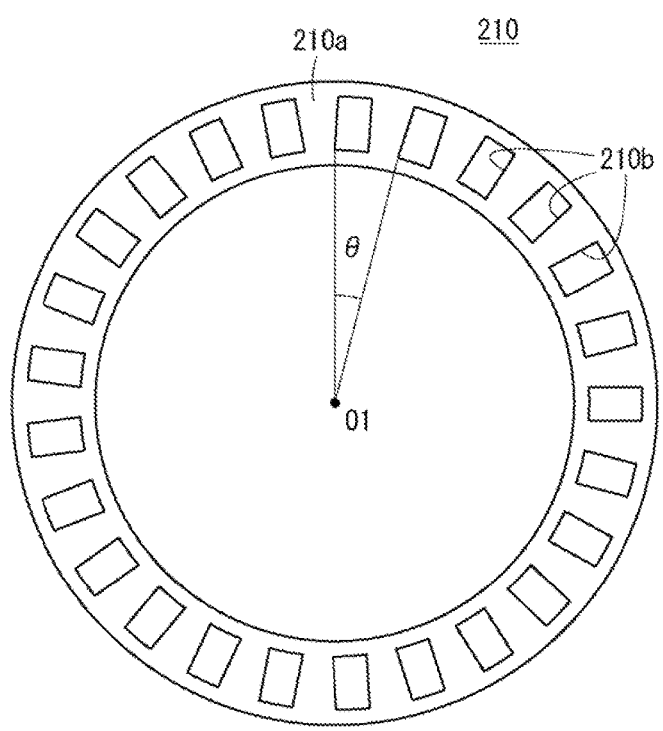
FIG. 9 is a view showing a configuration of a rotation-detected body shown in FIG. 8.

The controller 200 has a rotation angle detector 208 for detecting the rotation angle of the controller operation portion 202. The rotation angle detector 208 has a rotation detected body 210 and a rotation angle sensor (electronic component) 212. The rotation detected body 210 is provided in an inner wall of the controller operation portion 202. As shown in FIG. 9, the rotation detected body 210 is a magnetic body configured of an annular ring 210a, and multiple opening portions 210b provided in a penetrating manner along the outer circumferential surface of the ring 210a. The multiple opening portions 210b are spaced apart at constant angle θ intervals so as to form a circle, by using a center O1 of the annular ring 210a as a reference point. The rotation detected body 210 is provided in the controller operation portion 202, such that its center O1 coincides with the center of the rotary shaft 204 (rotation center of the controller operation portion 202).

The rotation angle sensor 212 is provided in an upper end face of the rotary shaft 204 so as to face the rotation detected body 210, and detects rotation of the rotation detected body 210 to thereby detect rotation of the controller operation portion 202. Although not shown, the rotation angle sensor 212 has a magnetic sensor with magnet, configured of a Hall effect sensor and a magnet. The rotation angle sensor 212 is a known device, in which the hall effect sensor detects variation in magnetic flux of the magnet, occurring between a state where the opening portion 210b of the rotation detected body 210 faces the hall effect sensor, and a state where the opening portion does not face the hall effect sensor, to thereby detect rotation of the rotation detected body 210. Hence, rotation of the controller operation portion 202 rotated by the rider also causes the rotation detected body 210 to rotate, so that the rotation is detected by the rotation angle sensor 212.

A click mechanism 214 for generating a clicking sense at every constant angle in the rotary operation of the controller operation portion 202 is provided in the controller 200. The click mechanism 214 is configured of a flat spring 216 provided in the upper end face of the rotary shaft 204, and the rotation detected body 210. The flat spring 216 is provided so as to face the opening portion 210b of the rotation detected body 210. The flat spring 216 has a protruding portion 216a protruding from its center toward the rotation detected body 210.

When the opening portion 210b of the rotation detected body 210 faces the protruding portion 216a, the protruding portion 216a is inserted into the opening portion 210b. Meanwhile, when apart other than the opening portion 210b of the rotation detected body 210 faces the protruding portion 216a, the protruding portion 216a is pressed against the biasing force of the flat spring 216. Thus, rotation of the controller operation portion 202 causes the flat spring 216 to generate a clicking sense at every constant angle θ.

A ring type spring 218 for holding the controller operation portion 202 (controller operation portion-main body 202a) in an initial position is provided between the controller operation portion 202 and the rotary shaft 204. Accordingly, the controller operation portion 202 is brought back to its initial position by the ring type spring 218, even when it is pushed in horizontal directions (left-right or front-rear direction). Note that the initial position is a position where the rotation center of the controller operation portion 202 coincides with the center of the rotary shaft 204.

Figure 10:
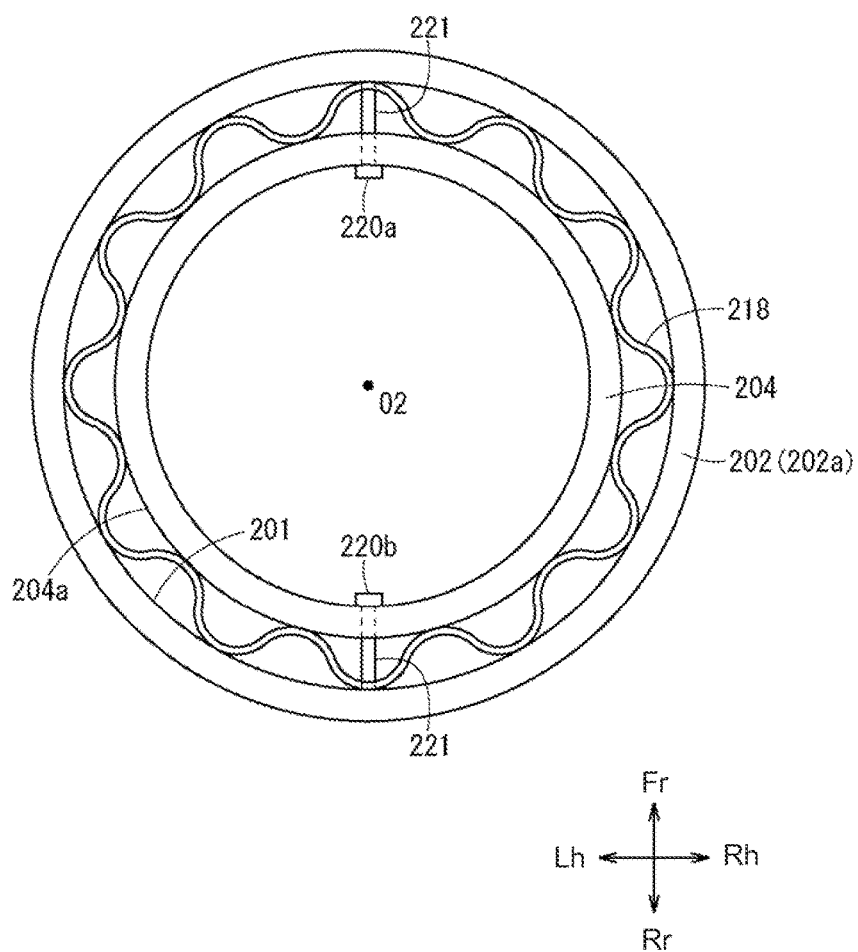
FIG. 10 is a cross-sectional view taken along line X-X of FIG. 8.

As shown in FIG. 10, the ring type spring 218 is provided between an outer circumferential surface 204a of the rotary shaft 204 and an inner circumferential surface 201 of the controller operation portion 202 (controller operation portion-main body 202a), where a center O2 of the ring type spring 218 coincides with the center of the rotary shaft 204 (rotation center of the controller operation portion 202). Additionally, buttons 220a, 220b (electronic component of controller 60) are provided in the rotary shaft 204 at the front and rear, and controllers 221 of the buttons 220a, 220b are provided so as to face the controller operation portion 202. Accordingly, when the controller operation portion 202 is pressed frontward with the thumb of the left hand holding the handle grip 38L, the controller 221 of the button 220b is pressed by the controller operation portion 202, so that the button 220b is turned on. Meanwhile, when the controller operation portion 202 is pressed rearward with the index finger of the left hand holding the handle grip 38L, the controller 221 of the button 220a is pressed by the controller operation portion 202, so that the button 220a is turned on. Thus, the controller operation portion 202 also functions as a push button (pushing controller). Note that the buttons 220a, 220b are arranged in positions shifted from the ring type spring 218 in the up-down direction, and in the third embodiment, are provided below the ring type spring 218.

Note that a sealing member 222 for preventing water, dust, and the like from entering the controller 200 from a gap between the controller operation portion 202 and the supporting portion 206 is provided between the controller operation portion 202 (controller operation portion-main body 202a) and the upper end face of the rotary shaft 204. The sealing member 222 is a rubber member, which is an elastic member. The sealing member and an elastic member 224, which is provided between the controller operation portion 202 (bottom cover 202b) and a lower end face of the rotary shaft 204, have a function of positioning the controller operation portion 202 in the up-down direction.

With this configuration of the controller 200, the controller operation portion 202 can be rotated, and function as a press button. The controller 200 has a selection function, in which function menus to be selected are switched through scrolling forward and backward, by rotating the controller operation portion 202 in first and second directions. The first and second directions are rotation directions opposite from each other.

Additionally, the controller 200 has a determination function, in which the selected function menu is determined by moving the controller operation portion 202 in a third direction different from the first and second directions. To be specific, the selected function menu can be determined by pressing the controller operation portion 202 frontward or rearward. Note that the controller 200 may have a function of resuming a home screen (initial screen) of a function menu by operating the controller operation portion 202 in a fourth direction different from any of the first to third directions. For example, if a direction in which the controller operation portion 202 is pressed frontward is set as the third direction, a direction in which the controller operation portion 202 is pressed rearward may be set as the fourth direction. The screen displayed on a display portion 30a or a meter device 18 returns to the home screen by operating the controller operation portion 202 in the fourth direction.

As has been described, in the third embodiment, the controller operation portion 202 of the controller 200 used to select multiple function menus of equipment, such as a navigation system. 30 and an audio unit 32, is arranged in a position different from multiple switches normally used in a straddle type vehicle 12 and provided in the switch box 48. Hence, it is possible to prevent the rider from confusing operation of the multiple switches in the switch box 48 with operation of the controller operation portion 202.

In addition, the rotary shaft 204 of the controller 200 inside the controller operation portion 202 is arranged lower than the lower wall face 48a of the switch box 48. Accordingly, the controller operation portion 202 is arranged lower than the lower wall face 48a, so that at least two or more kinds of functions (selection and determination of a function menu) can be operated with at least one finger (e.g., the thumb) while keeping hold of the handle grip 38L. Additionally, operability of the multiple switches provided in the switch box 48 can be maintained.

The outer diameter of the controller operation portion 202 is longer than the axial length of the rotary shaft 204 of the controller operation portion 202. Hence, the controller operation portion 202 can be formed in an appropriate size easily operable by rotation with the finger, while being kept from extending downward.

At least a part of a component constituting another electrical switch, which has its controller inside the switch box 48, is arranged in such a manner as to be inserted into the supporting portion 206. Accordingly, the component constituting the electrical switch can be arranged while utilizing space efficiently, so that enlargement in volume and height of the switch box 48 can be suppressed. Further, since the supporting portion 206 is formed inside the outer diameter of the controller operation portion 202, the controller operation portion 202 can be formed in a size easily operable by rotation with the finger, and the supporting portion 206 can be formed compactly, so that the component constituting the other electrical switch can be arranged efficiently.

| Description of Reference Numerals: | |
|---|---|
| 10 operation device | 12 straddle type vehicle |
| 14 handle bar | 18 meter device |
| 30 navigation system | 30a display portion |
| 32 audio unit | 38L, 38R handle grip |
| 42, 48 switch box | 48a lower wall face |
| 56 winker switch | 60, 110, 200 controller |
| 62, 114, 202 controller operation portion | |
| 64, 126, 204 rotary shaft | 66, 112 controller supporting portion |
| 84, 146, 208 rotation angle detector | 90, 148, 214 click mechanism |
| 206 supporting portion | 207 component |

The invention claimed is:

1. An operation device of a straddle type vehicle said operation device comprising:
a switch box having a plurality of switches, and being provided adjacent to and on an inner side in an axial direction of a grip portion, which is configured to be held by a rider and provided on both left and right ends of a handle bar extending in a left-right direction of the straddle type vehicle; and
a controller configured to operate at least two functions of equipment mounted on said straddle type vehicle,
wherein said controller includes a controller operation portion configured to provide rotary and other freely moving operations, a rotary shaft, and press-buttons,
wherein the rotary shaft of said controller is disposed outside the switch box and inside said controller operation portion, and is disposed lower than a lower wall face of said switch box,
wherein said controller includes a rotation angle detector configured to detect a rotation angle of said controller operation portion,
wherein said rotation angle detector includes a rotation detected body and a rotation angle sensor,
wherein said rotation detected body is detected by the rotation angle sensor,
wherein said controller operation portion is configured to provide
rotary operations for selecting a function menu out of a plurality of function menus, and
press-button functionality for determining the selected function menu,
wherein the rotary shaft is cylindrically shaped, and
wherein the rotary shaft and the press-buttons are disposed on a same axis of the controller extending in a front to rear direction of the straddle type vehicle.

2. The operation device according to claim 1,
wherein said rotary shaft of said controller extends downward from said lower wall face of said switch box, and
wherein an outer diameter of said controller operation portion is longer than an axial length of said rotary shaft of said controller operation portion.

3. The operation device according to claim 2,
wherein said controller includes a supporting portion rotatably supporting said controller operation portion, and provided with at least some electronic components of said controller, and
wherein said supporting portion is formed in a lower portion of said switch box, and is configured such that at least a part of a component constituting another electrical switch, which has a controller inside said switch box, is inserted into said supporting portion.

4. The operation device according to claim 3,
wherein said supporting portion is formed inside an inner diameter of said controller operation portion.

5. The operation device according to claim 1, wherein said controller includes a click mechanism configured to generate a clicking sense in the rotary operation of said controller operation portion.

6. An operation device of a straddle type vehicle, said operation device comprising:
switching means for switching various functions, said switching means being provided adjacent to and on an inner side in an axial direction of a grip portion, said grip portion being configured to be held by a rider and being provided on left and right ends of steering means which extend in a left-right direction of the straddle type vehicle; and
operating means for operating at least two functions of equipment mounted on the straddle type vehicle,
wherein said operating means includes providing means for providing rotary and other freely moving operations, a rotary shaft, and press-buttons,
wherein the rotary shaft of said operating means is disposed outside the switching means and inside the providing means, and is disposed lower than a lower wall face of said switching means,
wherein said operating means includes detecting means for detecting a rotation angle of said providing means,
wherein said detecting means includes a rotation detected body and a sensing means for sensing said rotation detected body, and
wherein said operating means provides
rotary operations for selecting a function menu out of a plurality of function menus, and
press-button functionality for determining the selected function menu,
wherein the rotary shaft is cylindrically shaped, and
wherein the rotary shaft and the press-buttons are disposed on a same axis of the operating means extending in a front to rear direction of the straddle type vehicle.

7. The operation device according to claim 6, wherein said rotary shaft of said operating means extends downward from said lower wall face of said switching means, and wherein an outer diameter of said providing means is longer than an axial length of said rotary shaft of said providing means.

8. The operation device according to claim 7, wherein said operating means includes supporting means for rotatably supporting said providing means, said supporting means being provided with at least some electronic components of said operating means, and wherein said supporting means is formed in a lower portion of said switching means, and is configured such that at least a part of a component constituting another electrical switch, which has a controller inside said switching means, is inserted into the supporting means.

9. The operation device according to claim 8, wherein said supporting means is formed inside an inner diameter of said providing means.

10. An operation device according to claim 6, wherein said switching means comprises a plurality of switches.

11. The operation device according to claim 6, wherein said operating means includes a clicking means for generating a clicking sense in the rotary operation of said providing means.

* * * * *